United States Patent [19]

Shoji

[11] Patent Number: 5,458,668
[45] Date of Patent: Oct. 17, 1995

[54] GOB DISTRIBUTING APPARATUS OF BOTTLE FORMING MACHINE

[75] Inventor: Naoki Shoji, Ayase, Japan

[73] Assignee: Toyo Glass Co., Ltd., Tokyo, Japan

[21] Appl. No.: 131,383

[22] Filed: Oct. 5, 1993

[30] Foreign Application Priority Data

Oct. 6, 1992 [JP] Japan .................................. 4-292170

[51] Int. Cl.$^6$ .............................. C03B 7/00; C03B 7/16; F16H 21/44; B65G 11/00
[52] U.S. Cl. ................. 65/222; 65/225; 65/304; 65/DIG. 13; 74/96; 193/22; 141/242
[58] Field of Search ............................ 65/164, 160, 207, 65/225, 221, 222, 304, DIG. 13; 74/96, 67, 665 L, 68; 193/22, 2 R, 23; 141/242, 237

[56] References Cited

U.S. PATENT DOCUMENTS

| Re. 28,073 | 7/1974 | Trudeau | 65/225 |
| 3,552,942 | 1/1971 | Trudeau | 65/225 |
| 3,585,017 | 6/1971 | Trudeau | 65/225 |
| 3,775,083 | 11/1973 | Nebelung et al. | 65/304 |
| 4,357,157 | 11/1982 | Cardenas-Franco et al. | 65/164 |
| 4,357,158 | 11/1982 | Garza | 65/207 |
| 4,529,431 | 7/1985 | Mumford | 65/225 |
| 4,599,101 | 7/1986 | Douglas et al. | 65/164 |

FOREIGN PATENT DOCUMENTS

| 0202116 | 11/1986 | European Pat. Off. . |
| 0273559 | 7/1988 | European Pat. Off. . |
| 2558149 | 7/1985 | France . |
| 4-342426 | 11/1992 | Japan | 65/221 |
| 1266975 | 3/1972 | United Kingdom . |
| 2148877 | 6/1985 | United Kingdom . |
| 2152923 | 8/1985 | United Kingdom | 65/207 |

*Primary Examiner*—W. Gary Jones
*Assistant Examiner*—Steven P. Griffin
*Attorney, Agent, or Firm*—Sughrue, Mion, Zinn, Macpeak & Seas

[57] ABSTRACT

A bottle making machine includes a gob distributing apparatus in which a plurality of molds are arranged in a plurality of rows with equal spaces with each other and a plurality of chutes are arranged at entrance portions of respective molds. The apparatus comprises a plurality of rotation shafts of the numbers corresponding to the numbers of the rows of the molds, a plurality of scoops secured to the respective rotation shafts for distributing gobs to the chutes, respectively, a plurality of servo-motors having output shafts of the numbers corresponding to the numbers of the rotation shafts and a plurality of link mechanisms connecting the output shafts of the servo-motors to the rotation shafts, respectively, to independently drive the rotation shafts by the corresponding servo-motors.

6 Claims, 5 Drawing Sheets

GOB DISTRIBUTING APPARATUS OF BOTTLE FORMING MACHINE

BACKGROUND OF THE INVENTION

1. Field of the Invention

The present invention relates to a gob distributing apparatus of a bottle forming machine particularly provided with an improved mechanism for operating scoops of the gob distributing apparatus.

2. Description of the Related Art

In a prior art, there is known a gob distributor of a bottle forming machine in which a plurality of molds are arranged in a plurality of rows with equal spaces with each other, stationary (fixed) chutes are disposed to inlet entrance portions of the respective molds, and a plurality of scoops are swung together with a plurality of rotation shafts of the numbers corresponding to those of the mold rows to thereby distribute the gobs to the respective chutes.

In the gob distributor of this kind, the respective rotation shafts are operatively connected to one synchronous motor by way of speed reduction mechanisms, speed increasing mechanism and complicated mechanical mechanisms including, for example, a worm gear, a wheel gear, a mechanical cam, a cam roller, a sector gear, a pinion gear, etc., and when this synchronous motor is driven, the respective scoops are operated in accordance with the predetermined order, thereby distributing the gobs to the molds of the bottle forming machine.

However, according to the structure of the gob distributor of the bottle forming machine of the type described above, the driving force of the motor is transferred through the mechanical mechanisms including respective gears, so that the power transferring efficiency is low and mechanical failures due to frictional forces being imposed on the gears often occur.

Furthermore, the assembling of these complicated mechanical mechanisms requires specific techniques and experts, and in order to maintain the good assembling performance, it is necessary to often carry out maintenance workings, thus being troublesome and inconvenient.

In this connection, as described above, in the conventional mechanical mechanism, a hole, in which respective gears or other mechanical members are accommodated, is required in the divided casing for the worm gear shaft, the cam shaft, the sector gear shaft, the output shaft or the like. Hence, the members of the casing must be assembled carefully to assure that the devices are centered in the hole.

Still furthermore, in the described prior art, since the rotation shafts are rotated by the mechanical mechanisms, errors in the swinging motions of the rotation shafts are amplified by, for example, backlashes of the respective gears when the scoops secured to the rotation shafts are swung. Accordingly, it becomes difficult to precisely index the stationary positions of the respective scoops.

In a case where the stationary positions of the scoops are not precisely settled, the front end of each of the scoops is shifted or offset from an extension line from the location of the corresponding stationary chute disposed at the entrance of the mold, which will result in so-called a snake-shaped distribution for the gob, and hence, when the gob is distributed from the scoop to the stationary chute, the gob is conveyed in a meandering motion. The meandering motion of the gob will cause the shifting of a fall-down position of the gob in the mold, which results in the production of a glass product such as glass bottle having uneven thickness. Moreover, since the gob falling time is made uneven, the production speed will be made slow and the productivity will be also made worse.

SUMMARY OF THE INVENTION

An object of the present invention is to substantially eliminate defects or drawbacks encountered in the prior art described above and to provide a gob distributing apparatus of a bottle forming machine capable of accurately conveying or transferring gobs from scoops to stationary chutes disposed at entrance portions of molds of the bottle forming machine with substantially less mechanical failure or trouble.

This and other objects can be achieved according to the present invention by providing a gob distributing apparatus of a bottle making machine in which a plurality of molds are arranged in a plurality of rows equally spaced from each other, in succession comprising:

a plurality of chutes arranged at entrance portions of respective molds;

a plurality of rotation shafts of the numbers corresponding to the numbers of the rows of the molds;

a plurality of scoops secured to the respective rotation shafts for distributing gobs to the chutes, respectively;

a plurality of servo-motors having output shafts of the numbers corresponding to the numbers of the rotation shafts;

a control means for controlling an operation of the servo-motors; and a plurality of link mechanisms connecting the output shafts of the servo-motors to the rotation shafts, respectively, to independently drive the rotation shafts by the corresponding servo-motors.

In a preferred embodiment of the gob distributing apparatus, two rotation shafts to which two scoops are independently secured are arranged and two servo-motors are operatively connected to the two rotation shafts independently.

The servo-motors are accommodated in a casing and the output shafts of the servo-motors are secured to a wall structure of the casing in a suspended manner.

The servo-motors are direct drive servo-motors.

The link mechanisms are parallelogram link mechanisms through which power from the servo-motors are transferred to the rotation shafts with a power transfer ratio of 1:1. The output shafts of the servo-motors are connected to the parallelogram link mechanisms through eccentric pins integrally rotated with the output shafts.

The control means is a personal computer.

According to the present invention of the characterics described above, when the servo-motors are driven, the rotation shafts are independently rotated by way of the link mechanisms, respectively, and the respective scoops can hence be swung independently to distribute the gobs to the chutes arranged stationarily. In these operations, since the driving forces of the respective servo-motors are transferred to the rotation shafts through the link mechanisms, there is caused no error in the swinging motion due to, for example, backlashes of mechanical members such as gears. Thus, the stationary (fixed) positions of the respective scoops can be precisely indexed, and furthermore, since the power transmission is performed only by way of the link mechanisms of simple structure, mechanical faults will be significantly eliminated, resulting in an improvement in maintenance of the apparatus itself.

DESCRIPTION OF THE PREFERRED EMBODIMENT

A double shaft type gob distributing apparatus of a bottle forming machine according to the present invention will be described hereunder with reference to the accompanying drawings.

Figure 1:
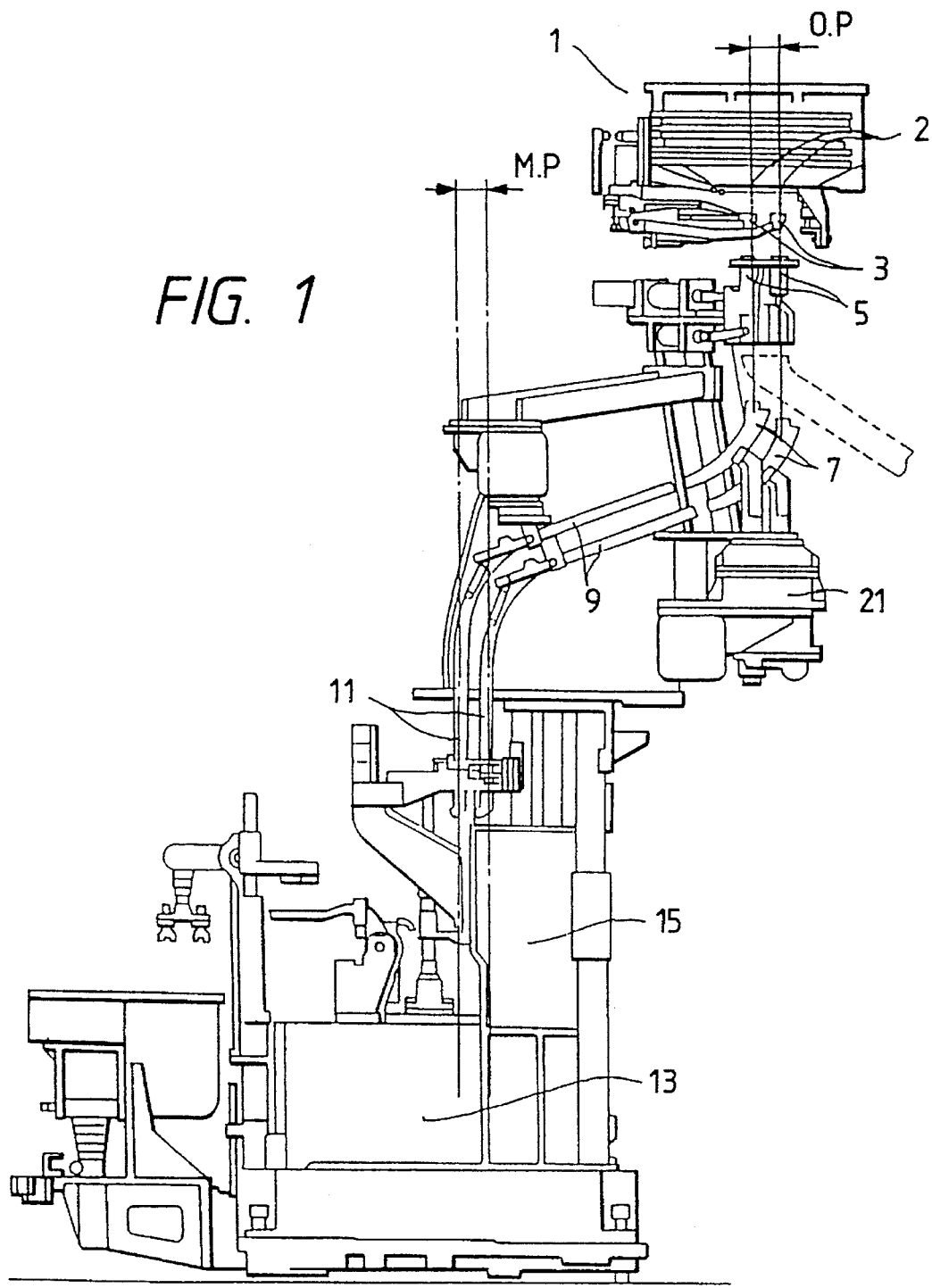
FIG. 1 is a schematic view showing a structure of a gob distributing apparatus of one embodiment of a glass forming machine according to the present invention.

First, referring to FIG. 1, reference numeral 1 denotes a spout disposed at a front end of a forehearth, and the inside of this spout 1 is filled up with fused glass, which falls down through an orifice 2 formed to a seat portion of the spout 1 and then cut off by means of a shear 3. The cut-off fused glass is called a gob, which is then transferred to a scoop 7 through an upper funnel S of an IS type forming machine. The scoop 7 is constructed to be swingable through a mechanism described hereinlater, and the gob is distributed to a plurality of chutes, i.e. troughs 9 by way of the scoops 7.

A deflector 11 is disposed to the front end portion of each of the troughs 9, and a funnel and mold, not shown, are disposed to the front end portion of the deflector 11. The gob is hence fed into the mold through these members. In FIG. 1, the IS type forming machine is provided with a section frame 13 and a side frame 15.

According to the structure of the present embodiment, a gob distributing apparatus for distributing the gob to the trough 9 and the deflector 11 has a characteristic feature and, moreover, a mechanism 21 for swinging the scoop 7 itself has a specific feature.

Figure 2:
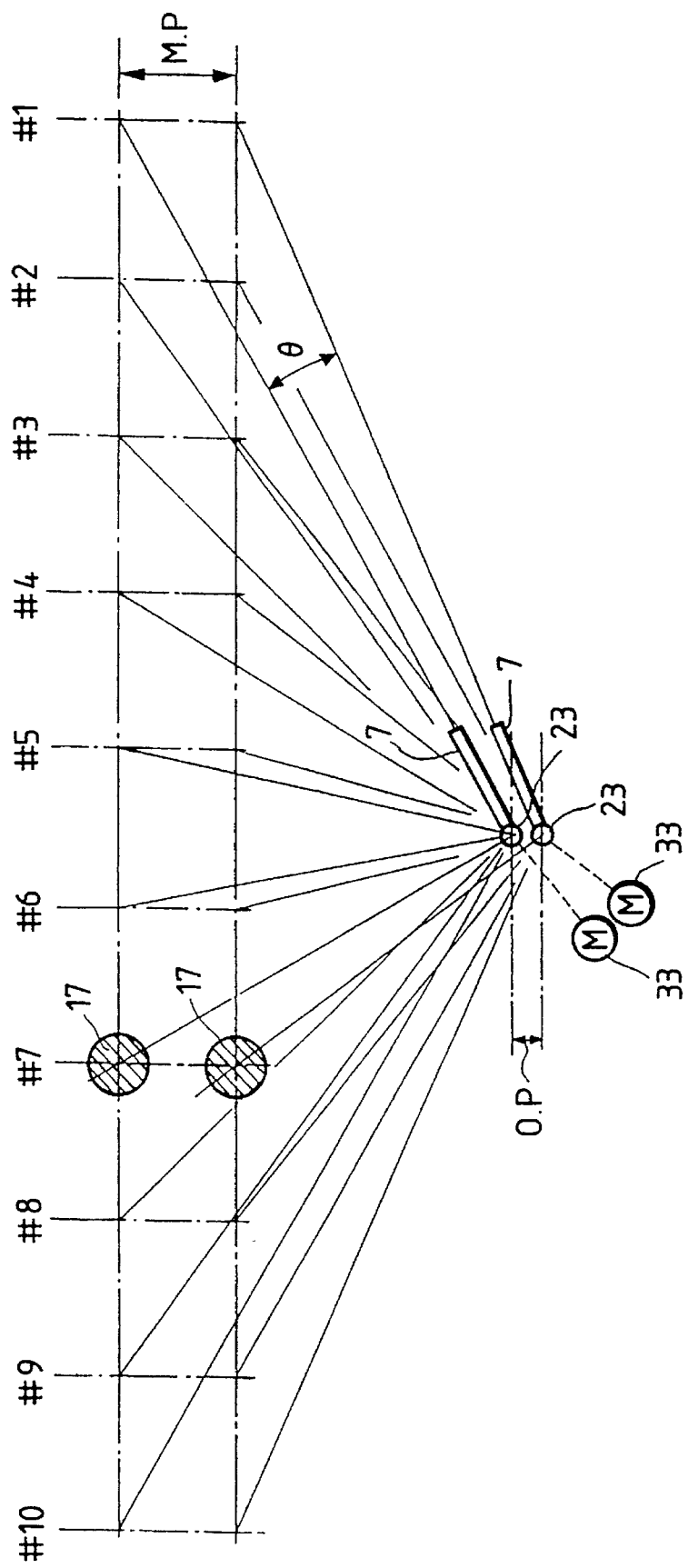
FIG. 2 is a plan view representing an arrangement of molds and scoops in the glass forming machine of FIG. 1.

FIG. 2 is a schematic view showing an arrangement of the molds 17 and the scoops 7. According to the example of FIG. 2, two rows of molds 17 are arranged i.e. front and rear stage rows each including ten molds, respectively, and the scoops 7 are also arranged in two, upper and lower stages, as shown in FIG. 1, adapted to distribute the gobs to the respective rows of the molds while swinging. Namely, in the illustrated embodiment, two scoops 7 are arranged at an angle Θ apart from each other, and the respective scoops 7 are secured to the corresponding rotation shafts 23, which are arranged in conformity with pitches of two orifices 2 as shown in FIG. 1.

The rotation shafts 23, in this embodiment, are operatively connected to servo-motors independently so that the rotation shafts 23 are independently driven and controlled by the respectively corresponding servo-motors to carry out the swinging motions of the respective scoops 7 in a predetermined order to thereby distribute the gobs to the predetermined molds.

Figure 3:
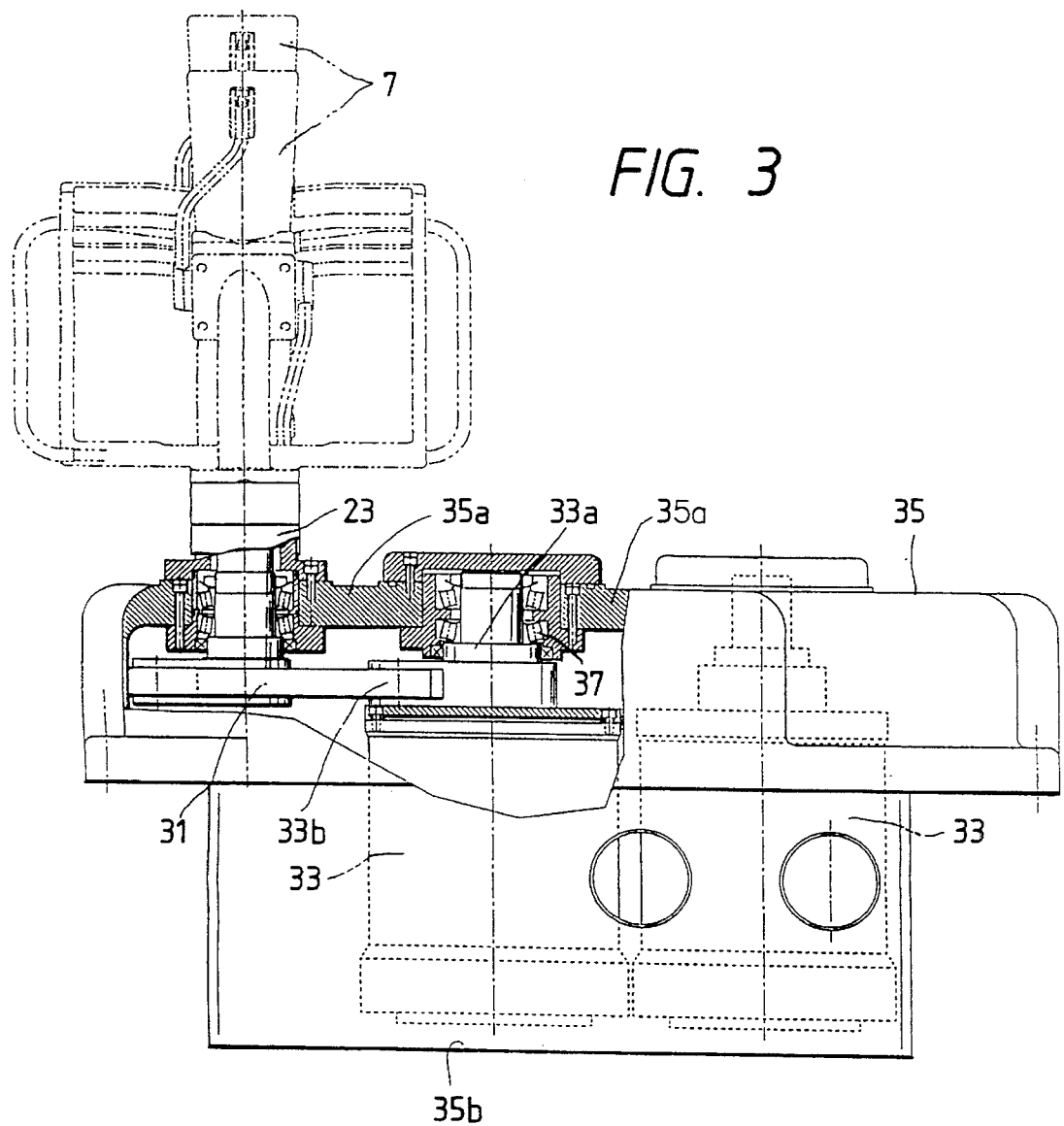
FIG. 3 is a sectional view, partially cut away, of a scoop driving mechanism of the gob distributing apparatus of FIG. 1.
Figure 4:
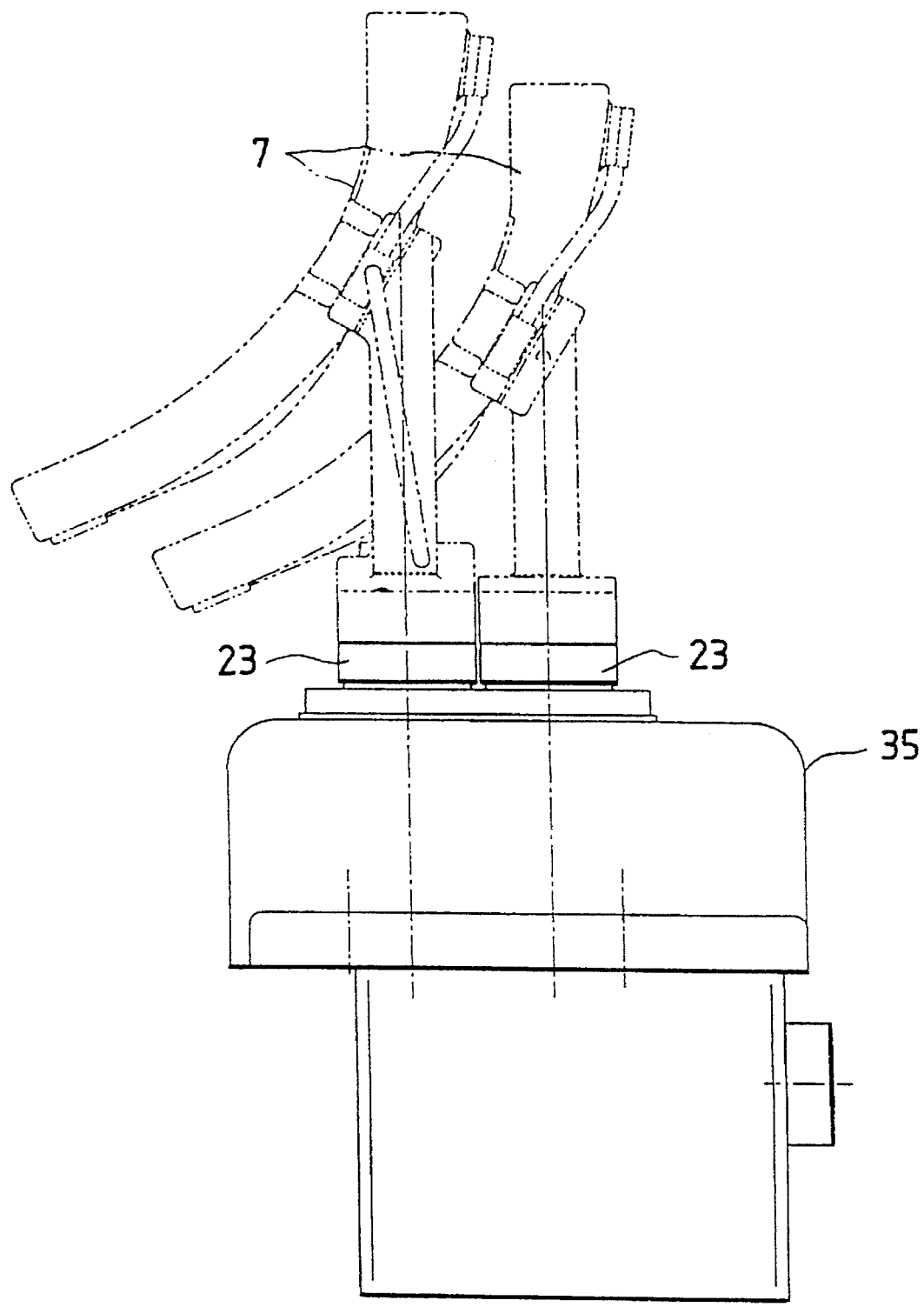
FIG. 4 is a side view of the scoop driving mechanism of FIG. 3.
Figure 5:
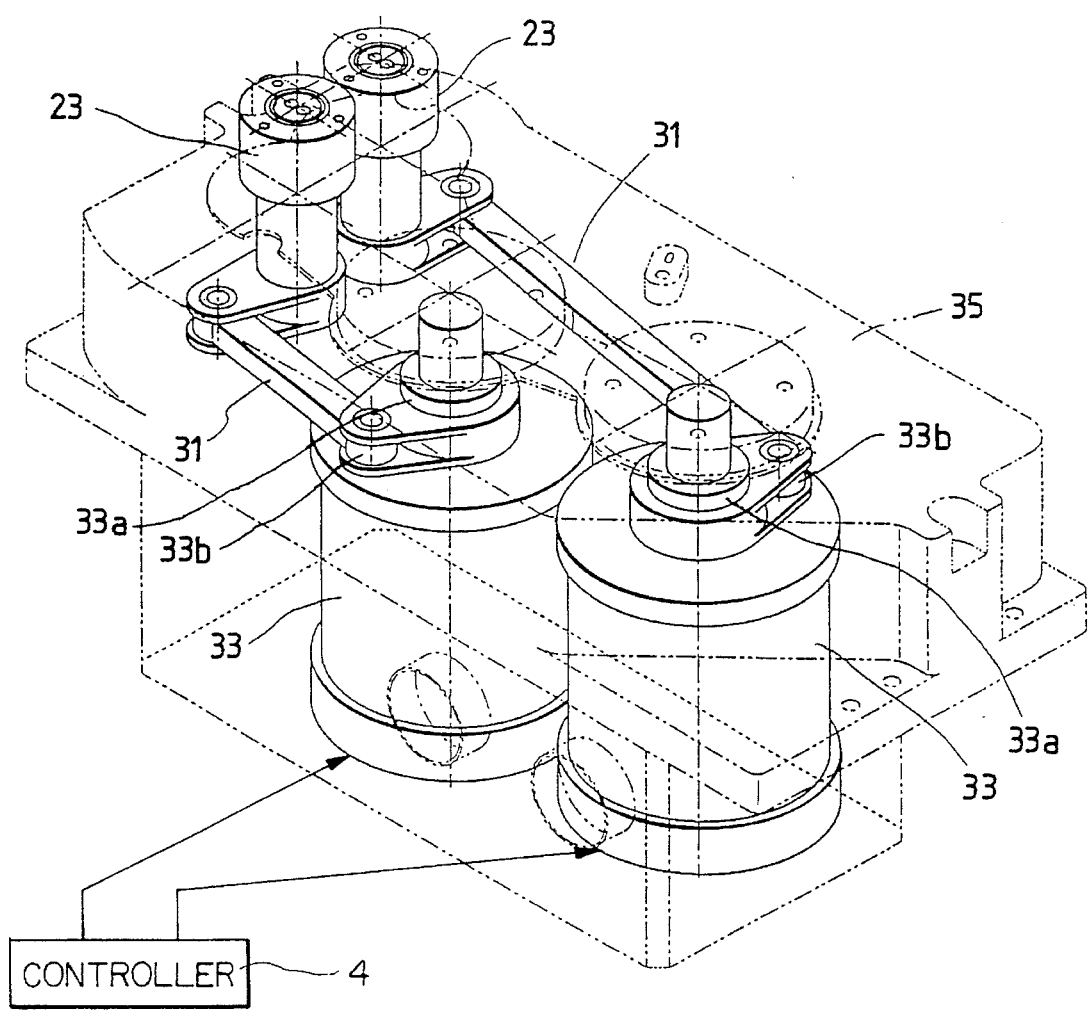
FIG. 5 is a perspective view of the scoop driving mechanism of FIG. 3.

The mechanism for swinging the scoops 7 has a structure described hereunder with reference to FIGS. 3 to 5.

Referring to FIGS. 3 to 5, the respective scoops 7 are secured to the corresponding rotation shafts 23, and the respective rotation shafts 23 are connected to the servo-motors 33 through parallelogram link mechanisms 31, respectively, for performing the power transmission with a ratio of 1:1. That is, each of the servo-motors 33 has a power output shaft 33a to which is provided an eccentric pin 33b rotated integrally with the output shaft 33a. The eccentric pin 33b is coupled with an end portion of the link mechanism 31. Accordingly, when the servo-motor 33 is driven, as controlled by a controller 4 such as a personal computer, the rotation shaft 23 is rotated by way of the parallelogram link mechanism 31, thereby swinging the scoop 7 secured to the rotation shaft 23. In this operation, the swing motions of the two scoops 7 are independently controlled or managed by a control means.

As shown in FIG. 5, these two rotation shafts 23 and servo-motors 33 are accommodated in a casing 35 so that they are supported by an upper wall structure 35a of the casing 35 through roller bearings 37 as shown in FIG. 3, from which it is to be understood that the servo-motors 33 do not contact a bottom plate 35b of the casing 35 and the servo-motors 33 are hence suspended from the upper wall structure 35a through the output shafts 33a. Further, in the described embodiment, lever members constituting the link mechanisms 31 are integrally provided on the rotation shafts 23 or output shafts 33a.

In this operation, when the parallelogram link mechanisms 31 are utilized, it is necessary to strictly accord the distance between the motor rotation center position and the output shaft rotation center position with the length of the link for precisely transferring the motor rotation angle to the output shaft. With this point, according to the present invention, the holes for the rotation shafts 23 and the output shafts 33a can be relatively easily made in the casing because other mechanical members such as cam shaft, the sector shaft and the worm gear shaft of the conventional apparatus, which require holes working, can be eliminated in the present invention.

The driving power of the servo-motor 33 is transferred to the rotation shaft 23 through the parallelogram link mechanism 31, and since the link mechanism 31 is disposed in the vicinity of the support portion (i.e. the upper wall structure 35a of the casing 35) of the servo-motor 33 and the rotation shaft 23, the driving power can be smoothly transferred without applying an excessive force, for example, couple of force, to the output shaft 33a of the servo-motor 33 and the rotation shaft 23.

It is desired that each of the parallelogram link mechanisms 31 has the maximum swinging angle is limited in consideration of an interference with the rotation shaft 23.

The operation of the gob distributing apparatus of the bottle forming machine according to the present invention of the structures described above will be described hereunder.

For the swinging mechanism of the scoop 7, the stationary (fixed) position of each scoop 7 has to be set, with reference to FIG. 2, on a calculated line connecting the center of the orifice, i.e. the center of the rotation shaft 23, and the center of the mold 17, and this will be of course referred to the respective scoops 7.

However, in the conventional mechanical type mechanism, there is a case where an angle of such calculated line cannot be maintained due to a performance on manufacturing of mechanical members such as cam member. Namely, in the conventional mechanism, the swing angle due to the cam member is suppressed to ¼ of the actual swing angle by the limitation of a pressure angle and this suppressed angle is increased four times up to the arrival to the rotation shaft. Accordingly, high working performance is required for the cam member, but in actuality, there is a case where some degree of angles may be shifted at the position of the rotation shaft. However, in the conventional mechanical mechanism, such shifting is hardly absorbed by any portion or member, and therefore, centering operation of the gob distributing line has been carried out on the basis of the angle of underperformance. That is, the centering operation for conforming the trough to the gob distributing line side.

However, according to the embodiment of the present invention, with reference to FIG. 2, in the case of supposing that, for example, the section #1 is decided as a basic standard, the fact that the directions of the respective sections #1 to #10 are positioned with what angles are inputted in and designated by, for example, a personal computer, and the scoops 7 are driven and controlled by the servo-motors 33 so that the respective scoops 7 are settled to the designated positions, respectively.

The servo-motors 33 can be controlled by the personal computer so that the servo-motor 33 has a resolving power of 0.001° and that the driving force of the servo-motor 33 is transferred with the ratio of 1:1 through the parallelogram link mechanism 31. Accordingly, in comparison with the conventional mechanical mechanism, any error in the swing motion of the scoop 7 caused by, for example, the backlash of the gears can be substantially eliminated, and therefore, the settling or stationary positions of the scoops 7 can be precisely controlled to the aimed and calculated angle positions.

Furthermore, according to the present embodiment, since a direct drive servo-motor (DD servo-motor, hereinlater) may be utilized as the servo-motor 33, any transmission mechanism such as speed reduction mechanism except for the parallelogram link mechanism 31 can be substantially eliminated, resulting in less members or elements leading the degradation of the performance of the gob distributing mechanism. Accordingly, the shifting of the stationary position of the scoop to the set stationary position is almost avoided, and hence, since it is not necessary to minutely adjust the stationary positions of the scoops 7, the centering of the troughs 9 can be always aligned to the calculated positions.

Generally, it is basically desired not to change or minutely adjust the angle of the stationary position of the scoop 7, but there is a case, due to the attaching position of the trough 9, where it is necessary to change the calculated basic stationary position, or the minute adjustment is required for the change in experiments of gob blowing conditions.

In such case, it will be decided that the basic stationary positions of the scoops 7 can be minutely adjusted with certain degree of angles by the following two methods, one being a method in which a setting value of the stationary angle is changed by means of a personal computer and the other being a method in which the scoop itself is displaced to a desired stationary position by way of manual means, i.e. hand operation, and this changed position is taught as a renewal stationary position of the scoop. In such case, the fact as to by what angles the minute angle adjustment was performed is recognized through information from an encoder of the DD servo-motor 33.

At any rate, according to this embodiment of the present invention, the stationary positions of the scoops 7 can be set extremely precisely on the calculated lines, respectively.

Further, with reference to FIG. 2, supposing that the orifice pitch OP is, for example, 111.1 mm (4⅜) and the mold pitch MP is, for example, 139.7 mm (5½), an angle $\Theta$ constituted by both the gob distribution lines, i.e. scoops 7, becomes 0.7° in maximum and 0.3° in minimum. In the example of FIG. 2, the maximum angle 0.7° appears at the sections #3 and #8 and the minimum angle appears at the sections #5 and #6. In such case, according to the conventional method, as a practical countermeasure, the angle $\Theta$ constituted by both the scoops was deemed and set as 0.5° being the mean value between the maximum and minimum values. Thus, the shifting of angle of 0.2° remains.

To eliminate such angular shifting, when the scoop 7 is arranged such that the front end of the scoop 7 is shifted from the front end of the trough 9, the gob distributing line provides a meandering shape, as viewed from a position directly above the glass forming machine, by such an amount as a sum of the shifted amount of the scoop 7 and the shifted amount of the trough 9.

However, according to the present embodiment, since the independent control systems and the DD servo-motors are provided for the respective rotation shafts 23, the stationary angles of the scoops 7 can be independently set for the respective rotation shafts 23. Thus, the difference in the swinging angles caused by the difference between the orifice pitch OP and the mold pitch MP can be substantially completely absorbed, so that all the scoops 7, the troughs 9 and the deflectors 11 can be completely aligned on lines with respect to all the sections and the rotation shafts 23 as viewing the gob distributing lines in a plane from the position directly above the machine.

As described hereinabove, according to the present invention, the meandering phenomenon of the gob distributing line appearing in the conventional mechanical gob distributing apparatus can be substantially completely eliminated and the stable gob fall-down motion can be realized, and accordingly, the bottle making or molding formation after the distribution of the gob can be performed smoothly and the quality of glass products can be remarkably improved.

Furthermore, according to the present invention, since any speed reduction mechanism is eliminated by arranging the DD servo-motors 33 and the parallelogram link mechanisms 31 for transferring the motor torques, the driving power can be transferred with the ratio of 1:1 (motor shaft:output shaft=1:1) without any increasing and decreasing. Accordingly, power transferring members or elements other than the parallelogram link mechanisms can be also eliminated, thus being made compact, resulting in the improvement of the power transferring efficiency and parts to be subjected to friction or wearing.

As described above, according to the present invention, the following advantages or effects can be additionally achieved.

Mechanical members elements provided for the conventional gob distributing apparatus are extremely eliminated, so that the gob distributing apparatus of the present invention can be easily assembled or disassembled.

Since such mechanical members or parts as cam and cam roller are not disposed, adjustments of abutting conditions of such members, which require the working of experts, can be eliminated. In this connection, any mechanical adjustment is not required for the maintenance of the performance of the swinging angle, so that there is no need of the minute adjustment mechanism such as for making eccentric a bearing housing or positioning parts with knock pins after the position adjustment, resulting in easy assembling working.

Since the motor positioning performance can be improved, the working for the maintenance of this performance can be reduced and simplified.

The location of the parallelogram link mechanisms can strictly accord the distance between the motor rotation center position and the output shaft rotation center position with the length of the link. Even in a case where the shape of the parallelogram link mechanism is not maintained strictly, there is less affect on the maintenance of the power output shaft swinging angle.

It is not necessary for the mechanisms for transferring the position and the power to be provided with any speed decreasing or increasing function, and the relationship between the swinging angle of the motor and the output shaft angle is maintained to be 1:1 only by the arrangement of the parallelogram link mechanisms. Accordingly, conversion working of the amount to be controlled is not required, thus the control being made easy, and furthermore, an angle for swinging the output shaft can be set as the rotation angle of the servo-motor as it is.

Furthermore, in the conventional speed reduction mechanism utilizing the roller gear and the worm gear, it is impossible to apply a force to the output shaft to rotate an input shaft, and particularly, in a system in which such conventional mechanical mechanism is combined with a servo-motor, it is difficult to take countermeasure to an emergency fault. However, according to the structure of the present invention, since any mechanical speed reduction mechanism is not accompanied and only the parallelogram link mechanism is utilized for the power transmission and conversion mechanism, in an emergency, the output shaft side can be manually moved and the safety operation can thus be achieved. Accordingly, at the time of setting the basic stationary angle position of the scoop, the scoop can be manually displaced to a desired stationary position, thus being effective and desirable.

Furthermore, since only the parallelogram link mechanisms of relatively simple structure are utilized, the hole making working is required for only the rotation shafts and the output shafts to the casing, thus eliminating the complicated and many hole making working can be eliminated as made in the conventional mechanical mechanism for transferring the power.

In the described embodiment, the case in which two rotation shafts and two servo-motors are referred to, but in a modification, these members of the numbers more than two may be arranged in conformity with the number of the scoops which corresponds to the number of rows of the mold.

What is claimed is:

1. A gob distributing apparatus of a bottle making machine in which a plurality of molds are arranged in a plurality of rows which are equally spaced in succession, comprising:

a plurality of chutes arranged at entrance portions of respective molds;

a plurality of rotation shafts of a number corresponding to a number of rows of the molds;

a plurality of scoops, each secured to a respective one of the rotation shafts for distributing gobs to the chutes;

a plurality of servo-motors collectively having output shafts of a number corresponding to a number of the rotation shafts;

a casing for accommodating said plurality of servo-motors, each said output shaft of said servo-motors being secured to said casing by being suspended from a wall of said casing;

means for controlling an operation of the servo-motors; and a plurality of link mechanisms, each connecting one of said output shafts of the servo-motors to its respective rotation shaft to drive the rotation shafts independently of each other by the corresponding servo-motors.

2. A gob distributing apparatus according to claim 1, wherein said plurality of rotation shafts includes two rotation shafts, said plurality of scoops includes two scoops with each of said two scoops being secured to one of said two rotation shafts independently of each other, and said plurality of servo-motors include two servo-motors, each operatively connected to one of said two rotation shafts independently of each other.

3. A gob distributing apparatus according to claim 1, wherein said servo-motors are direct drive servo-motors.

4. A gob distributing apparatus according to claim 1, wherein said link mechanisms are link mechanisms through which power from the servo-motors are transferred to the rotation shafts with a power transfer ratio of 1:1.

5. A gob distributing apparatus according to claim 4, wherein the output shafts of the servo-motors are connected to the link mechanisms through eccentric pins integrally rotated with the output shafts.

6. A gob distributing apparatus according to claim 1, wherein said control means is a personal computer.

* * * * *